United States Patent [19]

Stec

[11] Patent Number: 5,335,074
[45] Date of Patent: Aug. 2, 1994

[54] PHASE LOCKED LOOP SYNCHRONIZER FOR A RESAMPLING SYSTEM HAVING INCOMPATIBLE INPUT AND OUTPUT SAMPLE RATES

[75] Inventor: Kevin J. Stec, Medford, N.J.

[73] Assignee: Panasonic Technologies, Inc., Secaucus, N.J.

[21] Appl. No.: 96,635

[22] Filed: Jul. 23, 1993

Related U.S. Application Data

[63] Continuation-in-part of Ser. No. 14,820, Feb. 8, 1993.

[51] Int. Cl.$^5$ .......................... H04N 5/04; H04N 5/06
[52] U.S. Cl. .................................... 348/537; 348/540; 348/441
[58] Field of Search ............... 358/140, 148, 149, 150, 358/151, 153, 158, 159, 160, 139, 11, 13, 17, 19, 320, 330; 331/1 R, 14, 17, 20, 25; H04N 5/04, 5/05, 5/06, 5/073, 5/07, 5/10, 5/12, 5/95, 11/20

[56] References Cited

U.S. PATENT DOCUMENTS

| | | | |
|---|---|---|---|
| 3,806,644 | 4/1974 | Browne et al. | 358/140 |
| 4,404,583 | 9/1983 | Tatami | 358/19 |
| 4,567,507 | 1/1986 | Kusakabe et al. | 358/11 |
| 4,573,086 | 2/1986 | Sakai et al. | 358/310 |
| 4,597,019 | 6/1986 | Nishimoto et al. | |
| 4,691,226 | 9/1987 | Freyberger | |
| 4,802,009 | 1/1989 | Hartmeier | 358/140 |
| 4,853,781 | 8/1989 | Okano et al. | 358/148 |
| 5,057,911 | 10/1991 | Stec et al. | 358/13 |
| 5,148,276 | 9/1992 | Furumiya et al. | 358/148 |
| 5,150,201 | 9/1992 | Mehigardt et al. | 358/149 |

Primary Examiner—James J. Groody
Assistant Examiner—Michael Lee
Attorney, Agent, or Firm—Ratner & Prestia

[57] ABSTRACT

A video signal conversion system converts input video signals in a studio format, such as CCIR 601 (625/25), into output video signals in another format, such as the Phase Alternate Line (PAL) format. The horizontal line scanning frequency of the input and output signals is the same. The signal conversion system uses an output clock signal to determine the relative timing of the input and output video signals. This signal is generated by a phase-locked loop which employs a crystal-controlled VCO. The phase of the signal produced by the VCO is adjusted to maintain the sampling clock signals of the input and output video signals in a predetermined phase relationship. The phase error signal which is used to control the VCO is generated by comparing a first phase reference signal, generated from the output signal, to a second phase reference signal generated from the input signal. The output phase reference signal may be the synchronizing signal component of the converted video signal or an indication that a predetermined interpolation phase is being applied by the resampling system. The input phase reference signal may be the input clock signal or an indication of the start of a horizontal line interval.

15 Claims, 4 Drawing Sheets

PHASE LOCKED LOOP SYNCHRONIZER FOR A RESAMPLING SYSTEM HAVING INCOMPATIBLE INPUT AND OUTPUT SAMPLE RATES

This application is a continuation-in-part of application Ser. No. 08/014,820, filed, Feb. 8, 1993.

BACKGROUND OF THE INVENTION

The present invention concerns phase locked loop (PLL) synchronization systems and in particular, a PLL system in a video signal resampling system which generates a synchronized clock signal for a phase alternate line (PAL) output video signal using phase information from the input video signal.

Sample rate conversion systems are well known for converting television and other video signals from one format to another. An exemplary video signal standards conversion system is described in U.S. Pat. No. 5,057,911 entitled, SYSTEM AND METHOD FOR CONVERSION OF DIGITAL VIDEO SIGNALS, which is hereby incorporated by reference for its teachings on digital resampling techniques.

The system described in the above-referenced patent converts a component video signal having a nominal sample rate of 13.5 MHz into a digital signal having a sample rate of 14.31818 MHz, (hereinafter 14.3 MHz) which is compatible with the National Television Standards Committee (NTSC) Standard. The ratio of these two sample frequencies is exactly equal to the ratio of 33 to 35.

To obtain good performance from the resampling system it is desirable for the output sample clock signal to be locked in phase with the input sample clock signal. In the referenced patent, this may be achieved relatively easily by dividing the input sample clock signal by 33 and dividing the output sample clock signal by 35, applying both divided signals to a phase comparator and using the output signal of the phase comparator (not shown) to adjust the phase of the output clock signal.

These simple techniques are ineffective, however, for synchronizing an output clock signal for a phase alternate line (PAL) video signal to a standard studio component video signal, such as a CCIR 601 (625/25) signal. This signal has the same line and frame format as a PAL television signal (i.e. 625 lines/frame and 25 frames per second) but it uses a sample clock signal of 13.5 MHz which is 864 times the frequency of the horizontal line synchronization component of the video signal. The ideal sample clock signal for a sampled data PAL television signal, on the other hand, is 17.734475 MHz (hereinafter 17.7 MHz) four times the color subcarrier frequency ($4*f_{sc}$). This color subcarrier frequency, $f_{sc}$, is related to the horizontal line frequency ($f_h$) according to the equation (1).

$$f_{sc} = 1135*f_h/4 + 25 \tag{1}$$

Because of the 25 Hz offset which is added to the color subcarrier frequency, the largest common frequency between the 13.5 MHz input clock signal and the 17.7 MHz output clock signal is 50 Hz. If the output clock signal were synchronized to the input clock signal at this low frequency, the jitter in the resulting output clock signal would be so great as to make it unusable.

In this sense, the input and output clock signals are incompatible; neither signal can be directly locked in frequency and phase to the other signal using conventional phase locking techniques.

In existing conversion systems, an analog reference video signal, such as PAL color bars or black burst is used to gen-lock both the digital component input signal and the digital composite output signal. The digital component input signal uses the horizontal pulses of the reference signal as its phase reference while the digital composite output signal uses the color burst of the reference signal as its phase reference. The frame information (i.e. which frame of the multi-frame sequence is currently being processed) is used as a coarse adjustment for both the input and output signals. This method requires get-lock capability in the component source and an external reference signal.

SUMMARY OF THE INVENTION

The present invention is embodied in a sample rate conversion system which includes circuitry for inserting samples corresponding to the leading edges of the synchronization pulses into the input component signal, responsive to the input clock signal and field information derived from the input video signal.

These modified signals are applied to the conversion system which generates samples corresponding to a PAL video signal. The samples of this signal which correspond to the leading edges of the synchronization pulses vary from line to line due to the 25 Hz offset in the PAL subcarrier signal.

The exemplary apparatus according to the present invention takes advantage of this shift by comparing the phase of the synchronization pulses from the input signal signals representing the instantaneous relative phases of the sampling clock signals of the input signal and the resampled output signal to generate a phase difference signal which is then used to control the phase of the output clock signal. The compared signals are provided by the resampling system corresponding to instants when an output sample is generated at a predetermined interpolation phase.

DETAILED DESCRIPTION

Overview

In the exemplary embodiment of the invention described below, a 17.7 MHz clock signal for a digital PAL composite video signal is locked in phase to a 27 MHz clock signal (CK_IN) received with a CCIR 601 (625/25) component video signal.

Figure 1:
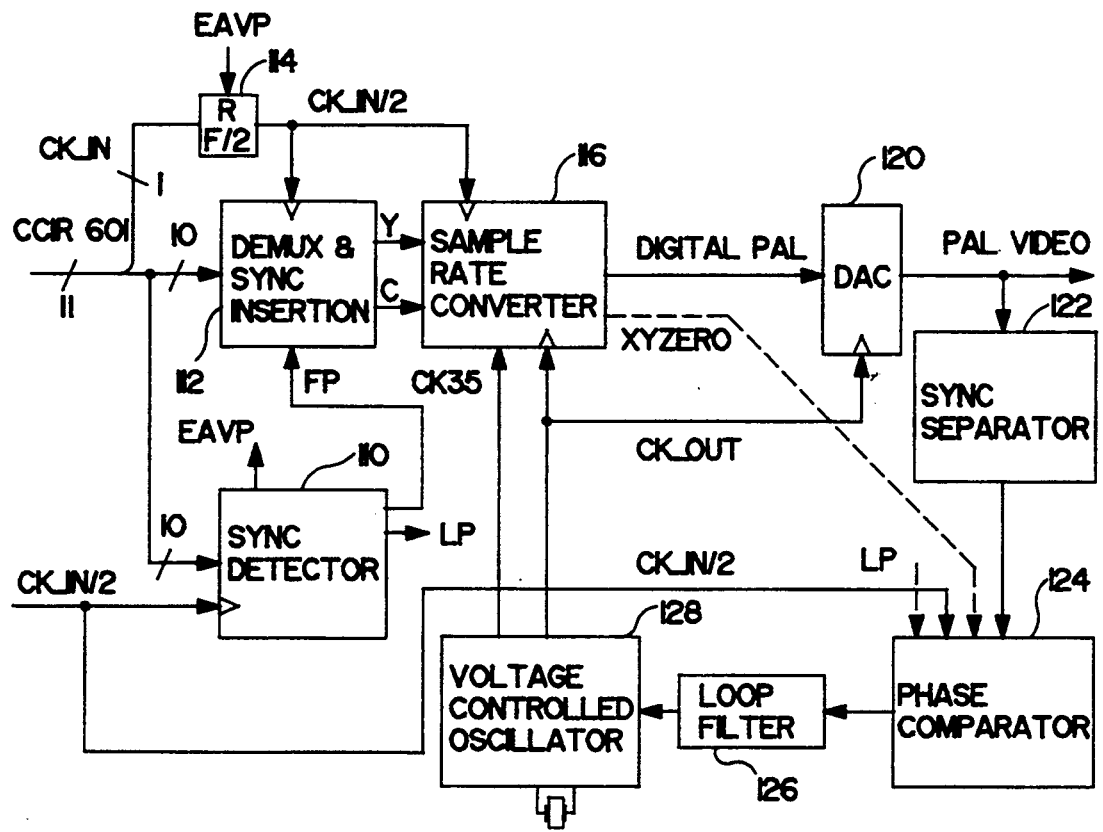
FIG. 1 is a block diagram of phase locking system according to the present invention.

Referring to FIG. 1, the CCIR 601 signal is applied to a synchronization signal detector 110 which generates a field pulse signal, FP, which has pulses coincident with the start of each field and a line pulse signal, LP, which has pulses coincident with the start of each horizontal line. The field pulse signal is used by synchronization signal insertion circuitry 112 to add well defined horizontal and vertical synchronization pulses to the CCIR 601 signal as it is broken into its separate luminance and chrominance components.

These component signals are then applied to a sample rate converter 116 which generates a PAL composite video signal using an output clock signal, CK_OUT which is provided by a voltage controlled oscillator (VCO) 128. This digital composite video signal is converted to analog format and applied to a synchronization signal separator 122, which extracts from it the translated horizontal synchronization pulses to provide a phase reference. Alternatively, a phase reference signal may be provided directly by the sample rate converter 116. If the signal LP is used as the input phase reference signal, the output phase reference signal should be the synchronization pulse that is provided by the separator 122; the signal XYZERO should not be used as the output phase reference signal when the signal LP is used as the input phase reference signal.

These phase reference signals have phases, relative to the horizontal pulses generated by the synchronization signal insertion circuitry 112, which vary in phase from line to line due to the 25 Hz offset in the PAL color subcarrier signal.

The PAL color subcarrier signal is generated from the 17.7 MHz output clock signal, CK_OUT, generated by the VCO 128. The frequency control voltage applied to the VCO 128 is generated by the phase comparator 124 and loop filter 126 to adjust the phase of the color subcarrier signal so as to minimize the difference in phase between the phase reference signal and the closest transition of the input clock signal, CK_IN which is used as the input phase reference signal. Alternatively, the signal LP may be used as the input phase reference signal.

Detailed Description of the Exemplary Embodiment

Figure 3:
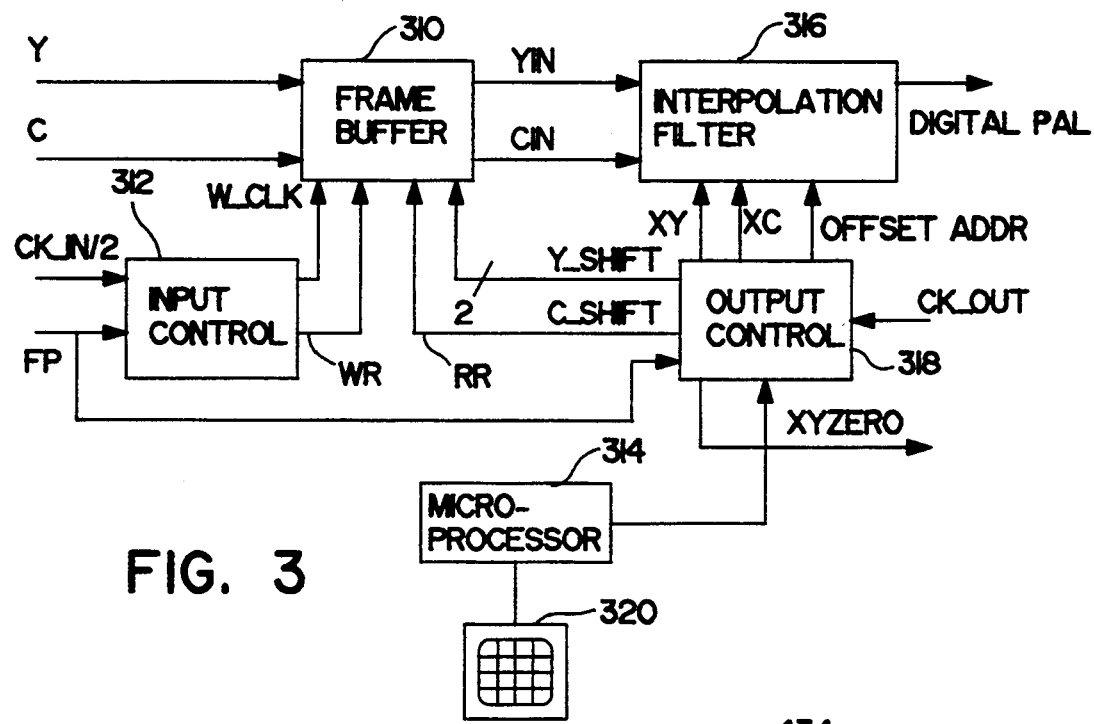
FIG. 3 is a block diagram of signal conversion circuitry suitable for use with the phase locking system shown in FIG. 1.

The circuitry shown in FIG. 3 implements a generalized resampling system in which a digital component input video signal having one sampling rate is converted into a composite video output signal having a different sampling rate. This circuitry locks the phase of the color subcarrier signal component of the output composite video signal to the sampling clock signal of the input component video signal.

The exemplary system, described below, converts video signals which conform to the CCIR 601 (625/25) component digital video standard to digital composite video signals compatible with the PAL Standard sampled at 4 times the color subcarrier frequency ($4f_{SC}$).

In the system shown in FIG. 1, an eleven-bit CCIR (601) video signal having a ten-bit samples with a sample rate of 27 MHz and a one-bit clock signal is applied to a the system. The accompanying sampling clock signal CK_IN, has a frequency of 27 MHz. Under the CCIR 601 standard, these ten-bit video samples include alternating luminance and chrominance signals where the chrominance signal includes two color-difference signals $C_R$ and $C_B$ (i.e. U and V, respectively).

The CCIR 601 signals are applied to a synchronization signal (sync) detector 110 and to demultiplexing (demux) and sync insertion circuitry 112 in parallel, while the signal CK_IN is applied in parallel to the sync detector 110 and to a frequency divide-by-two circuit 114 to produce a signal CK_IN/2 having a frequency of 13.5 MHz. The sync detector 110 generates a horizontal line pulse signal LP and a vertical frame pulse signal FP from the ten-bit sampled data CCIR 601 signal. The pulse signal LP indicates the start of each horizontal line and the pulse signal FP indicates the start of each frame of the CCIR 601 signal (i.e. the start of the first field of a two-field interlaced frame). In one exemplary embodiment of the invention, the signal LP is applied to the phase comparator 124 as an input phase reference signal for generating the output clock signal, CK_OUT.

To understand the operation of the sync detector 110, it is helpful to know how the horizontal and vertical blanking intervals are identified in the input signal. The CCIR 601 signal contains only active video information, timed for insertion into a composite video signal. It does not contain either horizontal or vertical synchronization pulses. It does contain, however, code words which indicate the start of active frame (SAF), end of active frame (EAF), start of active video (SAV) in a line and end of active video (EAV) in a line.

It is the EAV code word which is sensed by the sync detector 110. As shown in FIG. 1, the sync detector emits a pulse signal EAVP on encountering the EAV code word in the input sequence. This signal resets a frequency divider 114 which divides the 27 Mhz input lock signal CK_IN by two to produce a 13.5 MHz clock signal CK_IN/2. The signal EVAP synchronizes the signal CK_IN/2 with the horizontal line timing of the CCIR 601 input signal. The signal CK_IN/2 is used on the CCIR 601 side of the conversion circuitry, as described below, and is also applied to the phase comparator 124.

Figure 2:
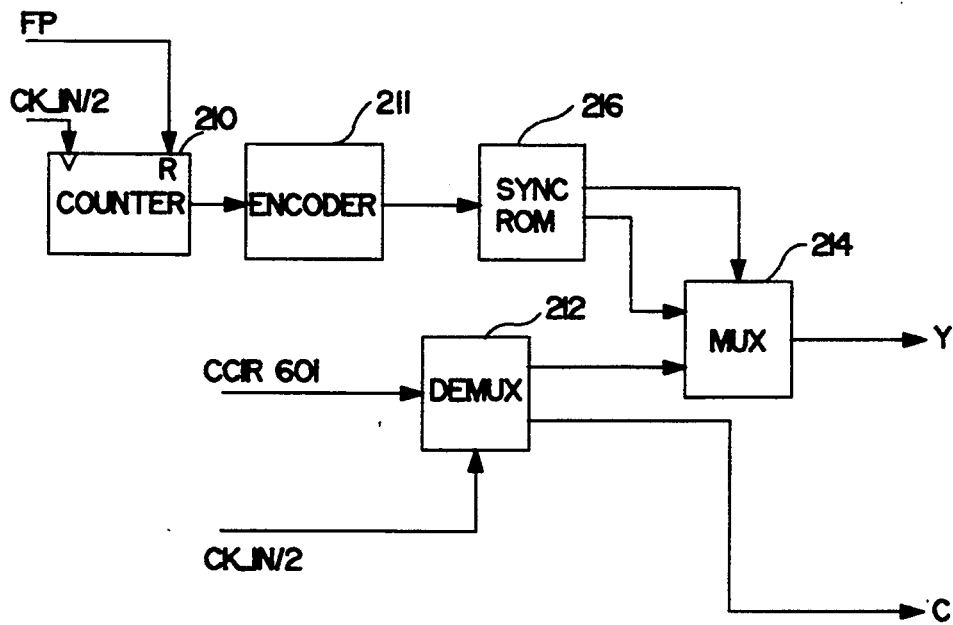
FIG. 2 is a block diagram of synchronization signal insertion circuitry suitable for us in the phase locking system shown in FIG. 1.

The signals LP and FP are generated by the sync detector 110 from the EAV code word and the EAF code word respectively. The signal FP is applied to the demux and sync insertion circuitry 112 along with the 13.5 MHz clock signal, CK_IN/2 developed by the frequency divide-by-two circuitry 114. Exemplary sync insertion circuitry 112 is shown in FIG. 2. In this circuit, the ten-bit CCIR 601 signal is applied to the data-input port of a demultiplexer 212 which is coupled to receive the signal CK_IN/2 as its control signal. The demultiplexer 212 provides samples of the luminance signal Y at one of its two output ports, and samples of the chrominance signal C at the other output port. The luminance samples are applied to one input port of a multiplexer 214. The other input port of the multiplexer 214 is coupled to receive a synchronization signal from a ROM 216.

The ROM 216 receives its address input signal from an encoder 211 which encodes a pixel number value provided by a counter 210. The signals CK_IN/2 and FP are applied to the respective clock and reset input terminals of the counter 210. Counter 210 may be, for example, a 20-bit counter. The signal FP resets the counter at the start of each frame. Consequently, the counter 210 counts 540000 CCIR 601 pixel positions (i.e. pulses of the signal CK_IN/2) between reset pulses. The 20-bit output value provided by the counter 210 is encoded into 11-bits by an encoder 211 and applied as the address input signal for the ROM 216. The encoder 211 changes the signal produced by the counter 210, which uniquely identifies each pixel in a frame, into a nine-bit signal which identifies the pixel positions to within one-half of one line interval and a 2 bit signal which indicates whether the pixels are to represent a vertical synchronization pulse, an equalization pulse or a horizontal synchronization pulse.

The address values applied to the ROM 216 describe the position of the current CCIR 601 pixel on the horizontal line and the vertical field of the image. In response to these address values, the ROM 216 produces samples representing horizontal and vertical synchronization signals at the proper pixel locations for insertion into the CCIR 601 video signal. The horizontal synchronization signal inserted by this circuitry includes a signal which represents an envelope for the color reference burst signal. As described below with reference to FIGS. 4 and 5, this signal is modulated into a color reference burst signal.

These synchronization samples are applied to the second input port of the multiplexer 214. The multiplexer 214 is controlled by the signal SI, also provided by the ROM 216 such that, when signal SI is in a logic-high state, samples from the ROM 216 are provided as the luminance signal Y; and when SI is in a logic-low state, samples from the demultiplexer 212 are provided as the signal Y.

Returning to FIG. 1, the signals Y and C developed by the sync-insertion circuitry 112, are applied to a sample rate converter 116. This circuit converts the luminance and chrominance component signals provided by the sync-insertion circuitry 112 into a digital PAL composite video signal.

As shown in FIG. 3, the signals Y and C provided by the circuitry 112 are applied to a frame buffer 310. In the exemplary embodiment of the invention, buffer 310 is a dual-port memory having at least 540,000 memory locations. In addition to the signals Y and C, buffer 310 receives a 13.5 MHz write clock signal W_CLK and a write reset signal WR from input control logic 312 and a 17.7 MHz read clock signal R_CLK and a read reset signal RR from output-control logic 318, described below. The output control logic 318 also produces an output phase reference signal XYZERO which may be used, preferably with the signal CK_IN/2, to synchronize the output clock signal, as described below with reference to FIGS. 1 and 6.

The input control logic 312 generates the write clock signal W_CLK from the 13.5 MHz clock signal CK_IN/2 and generates the write reset signal WR responsive to the frame pulse signal, FP, provided by the synchronization signal detector 110, as described above. Similarly, the output control logic 318 generates the read clock signal R_CLK from the 17.7 MHz clock signal CK_OUT and generates the read reset signal RR responsive to the signal FP.

The exemplary embodiment of the invention described below operates according to a fixed one-frame interval delay between the input signal and the output signal. Accordingly, both the write reset signal, WR, and the read reset signal, RR, are derived from the input frame pulse signal FP. It is noted, however, that the relative timing of the signals RR and WR may be adjusted by circuitry (not shown) to change the timing of the output signal in one-pixel intervals.

Configured as shown, the frame buffer 310 acts as a large first-in, first-out (FIFO) memory. Data values representing the luminance signal Y and chrominance signal C are written into the buffer 310 synchronous with the signal W_CLK and the buffer 310 is reset to its starting write address value responsive to the signal WR. Samples are read from the buffer 310 synchronous with the signal R_CLK and the starting address value for reading samples from the buffer is reset by the signal RR.

As described above, by controlling when the write and read address values are reset by the respective signals WR and RR, the system can implement a delay of up to one frame interval. This is desirable for studio applications where the PAL signal produced by the system may need to be delayed by as much as one frame interval to synchronize it with a video signal from another source.

The luminance and chrominance signals provided by the frame buffer 310 are applied to the interpolation filter 316 as the signals YIN and CIN respectively. Interpolation filter 316 also receives signals Y_SHIFT and C_SHIFT, which indicate when new luminance and chrominance samples, respectively are to be provided, and other control signals (i.e. coefficient set control signals XY and XC) from output-control circuitry 318.

As described in the above-referenced patent, the interpolation filter 316 resamples the luminance and chrominance samples stored in the frame buffer 310, converts the chrominance samples into a modulated chrominance component signal and adds the modulated chrominance signal to the luminance signal to produce the PAL output signal.

Figure 4:
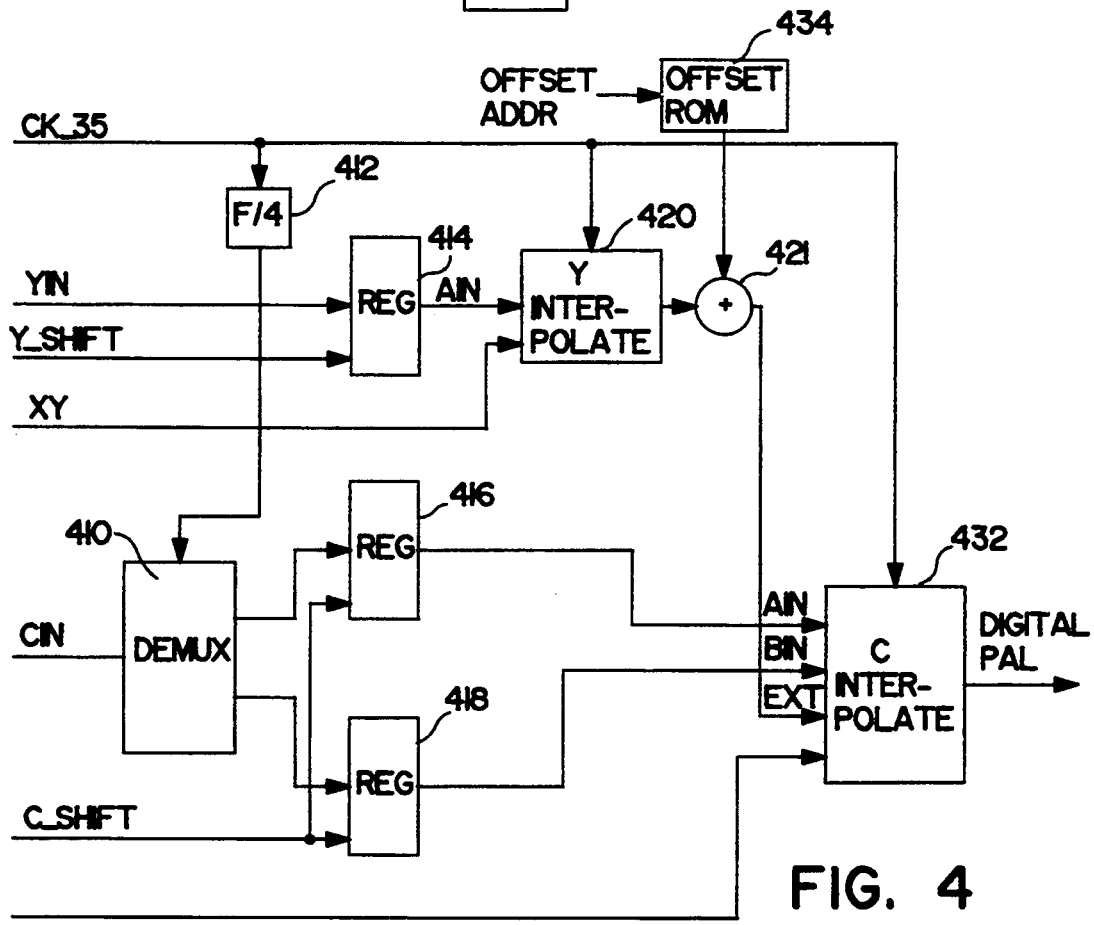
FIG. 4 is a block diagram of an interpolation filter suitable for use in the signal conversion circuitry shown in FIG. 3.

FIG. 4 is a block diagram of circuitry suitable for use as the interpolation filter 316. This filter operates using a 35.468944 MHz (hereinafter 35.5 MHz i.e. 8 $f_{sc}$) clock signal, CK_35, which is generated by the voltage controlled oscillator 128, as described below.

As shown in this Figure, the signal YIN is applied to a register 414 while the signal CIN is applied to a demultiplexer 410. The demultiplexer 410 separates the alternate $C_R$ and $C_B$ samples into two distinct sample streams, responsive to a 8.9 MHz (2 $f_{sc}$) clock signal which is derived from the signal CK_35 by the frequency-divide-by-four circuit 412. The two output signals of the demultiplexer 410 are applied respectively to registers 416 and 418.

The registers 414, 416 and 418 are responsive to a signal Y_SHIFT and C_SHIFT, provided by the output control circuitry 318 to load a new value of the respective signals YIN on one hand and $C_R$ and $C_B$ on the other when a respective new sample is provided by the frame buffer 310, shown in FIG. 3.

The output values held in the register 414 are read by a luminance interpolator 420 which resamples the signal YIN in accordance with the luminance coefficient addresses indicated by a signal XY, provided by the output control circuitry 318, shown in FIG. 3. The samples produced by this interpolator conform to the luminance component of a sampled data PAL video signal. Circuitry suitable for use as the interpolator 420 is described below with reference to FIG. 5.

The resampled luminance signal generated by the interpolator 420 is applied to one input port of an adder 421, the other input port of which is coupled to receive samples from a offset ROM 434. The offset ROM 434 provides digital samples representing a black-level correction term in response to a control signal, provided by the output control circuitry 318, shown in FIG. 3. This control signal is adjustable, via a control signal OFFSET_VAL, between a DC correction value for positive data and another DC correction value for inverted data such as the horizontal and vertical timing pulses.

The samples held by the registers 416 and 418 are applied to respective input ports AIN and BIN of a chrominance interpolator 432. The PAL luminance signal with the inserted synchronization signal is applied to an input terminal EXT of the interpolator 432. The sequence of filters used by the chrominance interpolator 432 is determined by a signal XC, provided by the output control circuitry 318.

The interpolator 432 processes the $C_R$ and $C_B$ signals to generate a sequence of samples, an the PAL sampling rate of 17.7 MHz which have the format $(C_R \pm C_B)$, $(C_R \mp C_B)$, $-(C_R \pm C_B)$, $-(C_R \mp C_B)$, $(C_R \pm C_B)$, .... The $\pm$ and $\mp$ operations indicate how the $C_R$ and $C_B$ samples are combined on successive lines of the video signal (i.e. $+,-$ on one line and $-,+$ on the next line). This is readily recognizable as the PAL modulation sequence where $C_R$ and $C_B$ correspond to the U and v color-difference signals, respectively.

These samples are combined with the interpolated luminance samples, Y, to generate a signal having the format $Y+(C_R \pm C_B)$, $Y+(C_R \mp C_B)$, $Y-(C_R \pm C_B)$, $Y-(C_R \mp C_B)$, $Y+(C_R \pm C_B)$, .... If $C_R$ and $C_B$ are the U and V color difference signals, respectively, this sequence is readily recognizable as representing a sampled data PAL color video signal.

Figure 5:
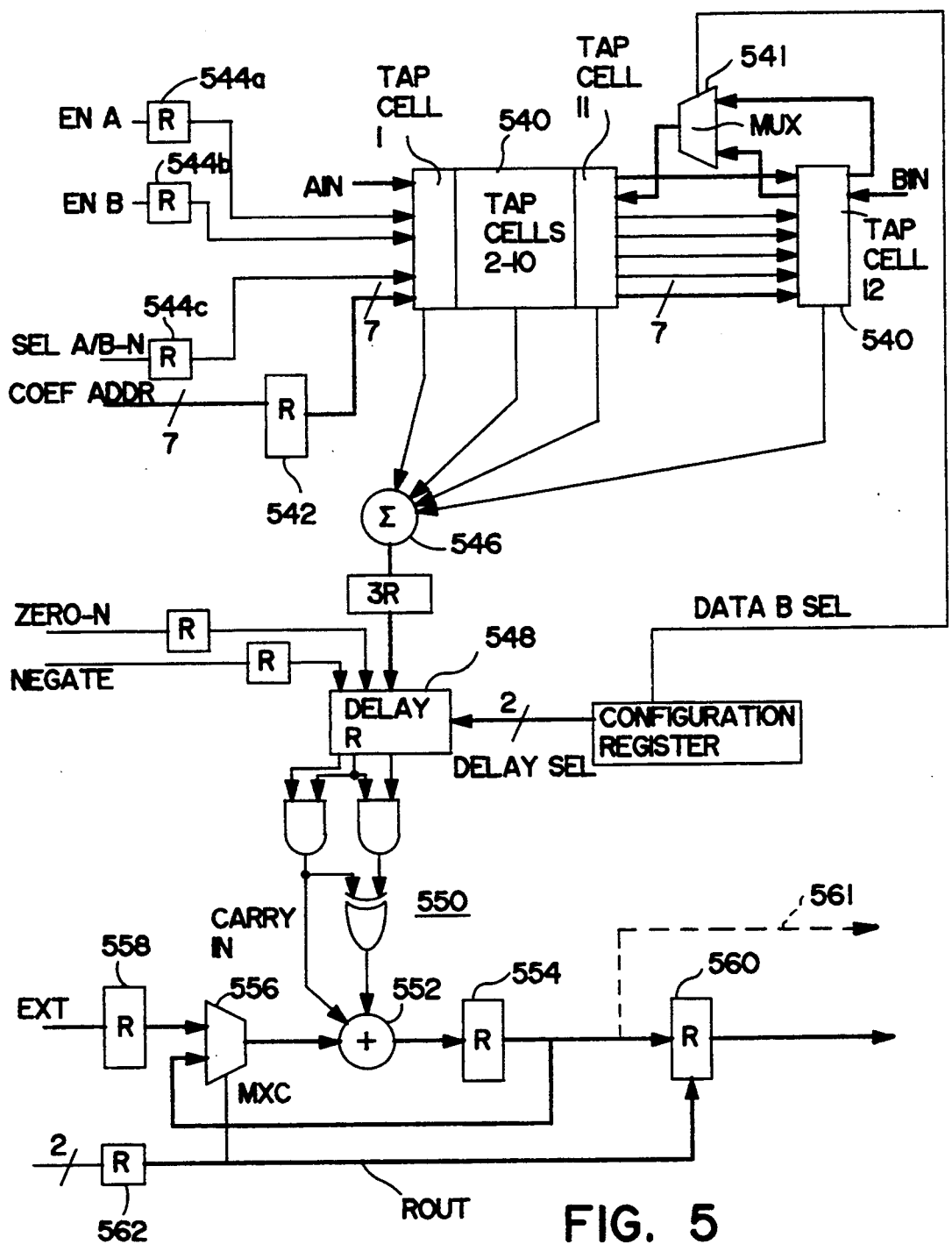
FIG. 5 is a block diagram of an interpolator suitable for use in the interpolation filter shown in FIG. 4.

FIG. 5 is a block diagram, partly in logic diagram form of an exemplary interpolator which may be used as either of the interpolators 420 or 432. As shown in FIG. 5, the signals AIN and BIN are applied to a bidirectional twelve-tap delay line 540. In the exemplary circuit, each tap of the delay line may be programmed with as many as 108 different sets of coefficient values. In response to a coefficient address signal (i.e. either XY or XC) provided by the output-control circuitry 318, each of the tap cells of the delay line 540 multiplies its AIN or BIN data value by a coefficient value from the selected set of coefficient values. Each value of the coefficient address signal causes the delay line 540 to use a different set of coefficient values and, thus, to implement a different filter. The B interpolation filters used in this embodiment of the invention are implemented through B different sets of coefficients addressed by the signals XY and XC.

For the luminance interpolator 520, only the AIN input port is used, the BIN input port is bypassed by a multiplexer 541 (shown in FIG. 5). For the chrominance interpolator 432, the $C_B$ signal is applied to the AIN input port while the $C_R$ signal is applied to the BIN input port. For the sake of brevity, only the operation of the chrominance interpolator 432 is described below. From this description and from the above-referenced U.S. patent, one of ordinary skill in the art could readily determine control signals to operate the luminance interpolator 420.

In the chrominance interpolator 432, each of the AIN and BIN input ports is coupled to a respective shift register which provides multiple taps for implementing a respective finite impulse response (FIR) filter. The AIN samples from all of the tap cells are multiplied by the respective coefficient values for $C_B$ as selected by the signal XC, applied via the COEFF ADDR input port and register 542, and then summed by the summing block 546. In the next sample interval, the BIN values held by the respective tap cells are multiplied by the respective coefficient values for $C_R$ and summed in the summing circuit 546. Thus, the summing block 546 alternately provides samples of the two filtered chrominance signals, $C_R$ and $C_B$, to a programmable delay element 548. In this embodiment of the invention, the delay element 548 is set to its minimum delay value.

The samples provided by the delay element 548 may be represented by a sequence $C_R$, $C_B$, $C_R$, $C_B$, .... These samples are applied to a selective inverting circuit 550. The circuit 550 is controlled by a signal NEGATE provided by the output-control circuitry 318. In the exemplary embodiment of the invention, the signal NEGATE causes samples of the interpolated chrominance signals to be selectively inverted so that the sequence of samples applied to the adder 552 is $C_R$, $C_B$, $C_R$, $-C_B$, $-C_R$, $-C_B$, $-C_R$, $C_B$, $C_R$, $C_B$, $C_R$, $-C_B$, . ... The inversion pattern of the $C_R$ samples alternates from line-to-line as a result of the PAL signal specification. In addition, the signal INVERT causes every fourth sample of the burst envelope signal to be inverted, forming a color reference burst signal.

The luminance interpolator 420 is responsive to a separate negate signal (not shown) to selectively invert samples of the luminance signal in the portion of the inserted synchronization signal that corresponds to the burst envelope to generate a color reference burst signal. The burst envelope signal was inserted as a part of the synchronization signal by the demultiplexing and synchronization insertion circuitry 112, described above with reference to FIGS. 1 and 2.

The adder 552 is part of an accumulator which includes register 554 and multiplexer 556. In the exemplary embodiment of the invention, successive samples of the interpolated luminance signal Y are applied to one input port of the adder 552 via an external input port EXT through a register 558 and a multiplexer 556 while the chrominance sample stream provided by the delay element 548 is applied to the other input port of the adder 552. The adder 552, operates at 35.5 MHz, twice the 17.7 MHz sample rate for a digital PAL signal. The input signal to the adder 552 from the multiplexer 556 alternates between the external luminance signal and the output signal provided by the accumulator register 554.

Thus, in one sample interval, the adder may provide a partial sample representing $Y+C_R$ and in the next interval, this sample would be cycled through the multiplexer 556 to be added to a $C_B$ sample. The result of this addition is a complete sample representing $Y+C_R+C_B$. The register 560 is conditioned by the signal ROUT to load only every other sample (i.e. only the complete samples) to provide an output signal at the PAL sample rate. Alternatively, the output signal provided by the chrominance interpolator 432 may be taken from the output port of the register 554, as indicated by the phantom output port 561. In this instance, it may be desirable to have a register external to the interpolator 432 which performs substantially the same function as the register 560.

Thus, the output signal produced at the output port of the register 560 is a sample stream $Y+(C_R \pm C_B)$, $Y+(C_R \mp C_B)$, $Y-(C_R \pm C_B)$, $Y-(C_R \mp C_B)$, $Y+(C_R \pm C_B)$, ... where the symbol $\pm$ indicates that the samples are added on one line and subtracted on the next and the symbol $\mp$ indicates that the samples are subtracted on one line and added on the next. As described above, the luminance signal has been modulated in the luminance interpolator 420 to include a color reference burst signal.

The summed luminance and chrominance samples are stored in the register 554 and then transferred to the register 560 synchronous with the next pair of sample values being applied to the adder 552. The register 560 provides output samples in the format and sample rate of a sampled data PAL composite video signal.

As set forth above, the offset ROM 434, shown in FIG. 4, provides a signal which corrects the black level of the samples provided by the luminance interpolator 420 to produce a desired black level for the PAL signal. Thus, the signal provided by the chrominance interpolator 432 is a sampled data PAL signal which includes a color reference burst signal and which has a corrected black level.

Figure 6:
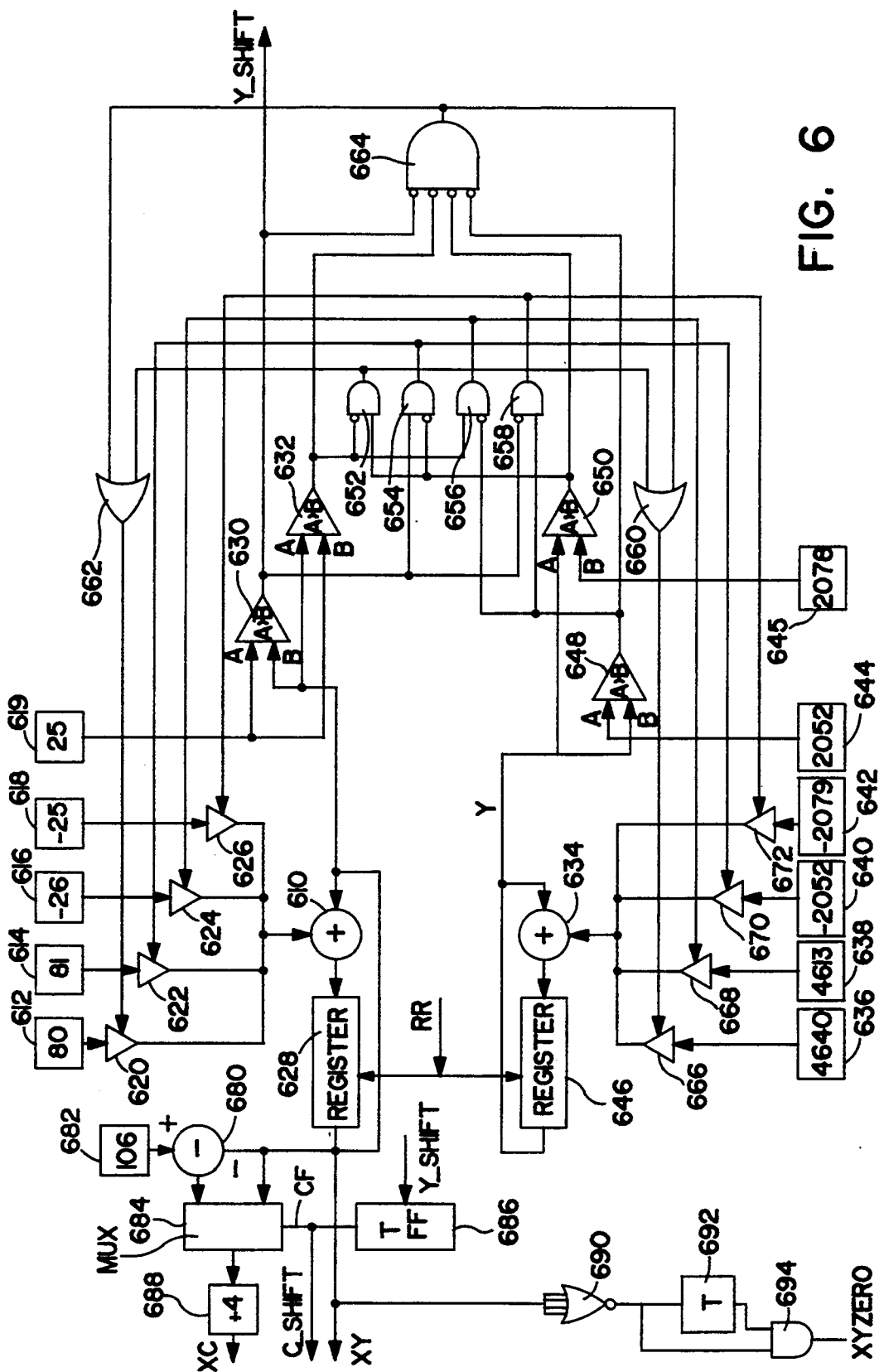
FIG. 6 is a logic diagram of circuitry suitable for use as the output control circuit shown of the signal conversion circuitry shown in FIG. 3.

FIG. 6 is a logic diagram, partly in block diagram form of circuitry suitable for use in the output control circuitry 318, shown in FIG. 3. The logic circuitry shown in FIG. 6 calculates the values XY, XC and Y_SHIFT which are applied to the interpolation filter 316, also shown in FIG. 3. The control circuitry shown in FIG. 6 may also generate the optional output phase reference signal XYZERO as described below. In addition, this circuitry calculates new values for the internal error signal Y. These values are calculated according to the equations (2), (3), (4) and (5).

$$Y\_SHIFT = INT\,((XY_i + A1)/106) \qquad (2)$$

$$XY_{i+1} = (XY_i + A1)\,MOD\,106 \qquad (3)$$

$$XC_{i+1} = INT(((1-CF)XY_{i+1} + CF(B + XY_{i+1}))/4) \qquad (4)$$

$$Y_{i+1} = (Y_i + RA1)\,MOD\,6692 \qquad (5)$$

In the circuitry shown in FIG. 6, A1 switches between 80 and 81 depending on whether the error value, $Y_i$, is above or below a threshold, respectively. Similarly, RA1 switches between 4640 and 4613 responsive to respective changes in state of the signal Y_SHIFT. Since division is difficult to implement in logic circuitry, the equations (2) through (5), as implemented in the logic circuitry shown in FIG. 6, have been simplified to eliminate the division. CF is a boolean variable which, as described below, allows a smaller number of sets of chrominance coefficients to be used than would otherwise be desirable.

In FIG. 6, register 628; adder 610; value sources 612, 614, 616, 618 and 619; three-state buffers 620, 622, 624, and 626; OR gate 662 and comparators 630 and 632 implement equations (2) and (3). Register 646; adder 634; value sources 636, 638, 640, 642, 644 and 645; three-state buffers 666, 668, 670 and 672, OR gate 660 and comparators 648 and 650 implement equation (5). The AND gates 652, 654, 656, 658 and 664 produce control signals which are shared by the two circuits. Equation (4) is implemented by adder 680, value source 682, multiplexer 684, trigger-type flip-flop 686 and integer divider 688.

In this circuit, the three-state gates 620, 622, 624 and 626 selectively provide one of the values 80, 81, −26 and −25 to the adder 610 to be added to the value of XY held in the register 628. Register 628 is reset by the read reset signal RR, which my be provided directly by the microprocessor 314, shown in FIG. 3, or generated by circuitry (not shown) internal to the output control circuitry 318 in response to a signal provided by the microprocessor 314.

The values 80 or 81 are applied to the adder 610, depending on the value of A1, when the comparator 630 indicates that the result of adding the value to the current value of XY will be less than 106. Values of −26 and −25 are applied when the comparator 630 indicates that the result of adding 80 or 81, respectively, to the current value of XY would cause the result to be greater than 106. Thus, the value of XY produced by the adder 610 at any instant is the same as that of an addition of 80 or 81, modulo 106.

The comparator 630 compares the present value of XY, provided by the adder 610, to the value 25 provided by value source 619 and produces a logic-high output signal when XY is less than 25, (i.e. when the addition of 80 or 81 to XY will not produce a value greater than 106). The output signal of comparator 630 is the signal Y_SHIFT. Another comparator, 632, also compares the current value of XY to 25 but produces a logic-high signal only when XY is greater than 25 (i.e. when the addition of 80 or 81 to XY will produce a value greater than 106). These signals are used, along with the output signals of the two error comparators 648 and 650, described below, to determine which of the values provided by the value sources 612, 614, 616 and 618 is to be applied to the adder 610.

The circuitry which implements equation (5) operates in a similar manner. The values, 4640, 4613, provided by the value sources 4640 and 4613, are the two values of RA1 corresponding to the error differential when the values of A1 are 80 and 81, respectively, and the values −2052 and −2079 are corresponding values which are used to implement modulo 6692 arithmetic.

The comparator 648 produces a logic-high signal only when the value of Y held in the register 646 is less than 2052. This signal indicates that the next value of Y (i.e. the result of adding either 4640 or 4613 to Y) will be less than 6692. Another comparator 650 provides a logic-high output signal only when the current value of Y is greater than 2078. This signal indicates that the next value of Y will be greater than 6692, and so, greater than the determined error threshold. In response to this signal, the appropriate negative value will be added to model modulo addition.

When XY is equal to 25 and Y is between 2052 and 2078, the output signals provided by all of the comparators 630, 632, 648 and 650 is logic-low. In this instance, the AND gate 664, via the OR gates 660 and 662 cause respective values of 80 and 4640 to be added to the values of XY and Y held in the registers 628 and 646, respectively.

The signal XY is applied to a NOR gate 690, delay element 692 and AND gate 694, as shown in FIG. 6, to generate the phase reference signal XYZERO. The gate 690 forms the logical NOR of the individual bits of the signal XY. Thus, when the signal XY has a value of zero (all bits logic-low), the signal produced by the NOR gate 690 has a value logic-high. This signal is a pulse signal having a pulse width substantially equal to the period of the signal CK_OUT. This is because, at the next pulse of the clock signal CK_OUT following a zero-valued signal XY, the value held by the register 628 and, thus the signal XY, becomes non-zero, causing the signal provided by the NOR gate 690 to become logic-low.

For proper operation of the synchronization system shown in FIG. 1, the input phase reference signal should have a 50 percent duty cycle and the output phase reference signal should have a pulse width that is approximately one-half of the period of the input phase reference signal. As described above, when the signal XYZERO is used as the output phase reference signal, the signal CK_IN/2 is the preferred input phase reference signal. As described above, this signal has a fifty-percent duty cycle and a frequency of 13.5 MHz. Thus, it has a pulse width of 37 nanoseconds (ns). The pulse width of the signal XYZERO is one perior of the 17.7 MHz output clock signal of 56 ns. The delay element 692 delays the signal provided by the NOR gate 690 by approximately 37 ns and applies the delayed pulse to an inverted input terminal of the AND gate 694. The signal XYZERO provided by the AND gate 694 has pulses which begin one gate delay (i.e. AND gate 694) after the pulses provided by the NOR gate 690 and which have a pulse width equal to the delay provided by the delay element 692 (i.e. approximately 37 ns).

While, in the exemplary embodiment of the invention, the signal XYZERO has pulses substantially coincident with the signal XY having a value of zero, it is contemplated that other values of the signal XY may be used to generate alternate phase reference signals which may be used in the same manner as the signal XYZERO.

As shown in FIG. 6, the value of XC is generated by selectively adding the value of XY to 106, depending on the value of the signal, CF, which is toggled between logic-low and logic-high each time that the signal Y_SHIFT goes from logic-low to logic-high. The result of this addition is divided by four to generate the new value for the signal XC. The circuitry which implements this function includes adder 680, value source 682, multiplexer 684, trigger-type flip-flop 686 and integer divider 688. Since, according to the CCIR 601 standard, there are one-half as many chrominance sample positions as luminance sample positions, the signal C_SHIFT has a frequency one-half of that of the signal Y_SHIFT. In the exemplary embodiment of the invention, this signal is the same as the signal CF. Alternatively, it may be desirable to generate the signal C_SHIFT as the logical AND (not shown) of the signal CF and the clock signal CK_OUT.

The digital PAL output signal of the interpolator 432, shown in FIG. 4, is the output signal of the interpolation filter 3! 6 of FIG. 3, which is the output signal of the sample rate converter 116, shown in FIG. 1. In FIG. 1, this digital PAL signal is applied to a digital to analog converter (DAC) 120 which converts the digital signal to an analog PAL baseband video signal. This analog baseband signal is the output signal of the sample rate conversion system.

The analog PAL signal may be also applied to a conventional PAL synchronizing signal separation circuit 122, which separates the horizontal synchronization pulse signal from the PAL composite video signal.

This separated signal, or the alternative phase reference signal XYZERO is applied to a phase comparator 124 as the output phase reference signal, along with an input phase reference signal which, in the exemplary embodiments of the invention may be either CK_IN/2 or LP.

The exemplary signal XYZERO has a pulse which occurs substantially coincident with a sample of the output luminance signal that is generated without interpolation of the input signal. Consequently, the pulses of the signal XYZERO represent instants at which the input and output sampling clock signals have nearly coincident pulses. This property of the signal XYZERO makes it a good signal to use to synchronize the input and output clock signals.

The phase comparator 124 is a sample-and-hold type of comparator which may include, for example, an edge detector (not shown), that generates a sampling pulse coincident with the a positive-going transition of the output phase reference signal (i.e. the separated PAL horizontal sync pulse or the signal XYZERO). Then, an integrator (not shown) integrates the input phase reference signal (i.e. LP or CK_IN/2) during the sampling pulse to produce an output signal which indicates the difference in phase between the output phase reference signal and the input phase reference signal. In the exemplary embodiment of the invention, the phase comparator is biased so that a logic-low value of the input phase reference signal is negative and a logic-high value is positive. Accordingly, the output signal of the phase comparator is zero when an edge of the input phase reference signal occurs in the center of the sampling pulse.

In the sense that the signal CK_IN/2 is generated by the frequency divider 114 that is synchronized to the horizontal-line timing of the input video signal by the signal EAVP, the signal CK_IN/2 is aligned with and, so, represents the horizontal line synchronization signal component of the input CCIR 601 signal for phase differences of less than one period of the signal CK_IN/2.

The signal LP is generated by the start of active video signal, SAV, and also represents the horizontal line synchronizing signal component of the input CCIR 601 signal. This signal may be gated to have a 50 percent duty cycle and compared with a similarly gated pulse generated from the signal provided by the sync separator 122 using the phase comparator 124.

As described above, the signal XYZERO indicates instants when the output sample clock signal is coincident with the input sample clock signal. These instants may occur at a frequency greater than the horizontal line frequency. Consequently, by using the signal XYZERO in place of the separated horizontal sync signal to lock the output clock signal, CK_OUT, to the input clock signal CK_IN/2, a more stable output clock signal may be generated. Since the pulses of XYZERO are at a frequency greater than the horizontal sync signal, when XYZERO is used as the output phase reference signal, the signal LP should not be used as the input phase reference signal.

If the signal LP and the separated PAL horizontal sync signal are used directly as the respective input and output phase reference signals, it may be desirable to use a different type of phase comparator such as, for example, a type II lead-lag detector (not shown).

The phase difference signal produced by the comparator 124 is applied to a loop filter 126 which integrates the phase difference signal to generate a frequency control value for the voltage controlled oscillator (VCO) 128. The frequency of the signal produced by the VCO 128 is controlled by a resonant crystal 129 to remain within a narrow frequency range surrounding 35.5 MHz (8 $f_{sc}$). The frequency and phase of the output signal produced by the VCO 128 are adjusted within this frequency range by the frequency control signal produced by the loop filter 126. In addition to the 35.5 MHz clock signal, the VCO 128 provides a 17.7 MHz (4 $f_{sc}$) clock signal, CK_OUT.

Both of these clock signals are locked in phase to the input CCIR 601 video signal. The phase lock occurs because, in the CCIR 601 standard, the 13.5 MHz clock signal is locked in phase to the horizontal line synchronizing signal component of the CCIR 601 signal. The sample rate converter converts the CCIR 601 signal, including to a PAL composite video signal having substantially the same line and field timing. Because, however, the line timing of the PAL composite video signal is generated using the 17.7 MHz clock signal, it may drift relative to that of the CCIR 601 signal in response to variations in the frequency or phase of the 17.7 MHz signal. This drift is corrected by using any measured phase difference between the input clock signal and output horizontal synchronization pulses to change the frequency of the 17.7 MHz signal in a sense which tends to drive the phase difference to zero.

This circuit operates well because the sample rate conversion circuit is very accurate. The inventors have determined that the exemplary conversion circuit described above has a sample timing accuracy of better than 1 nanosecond (ns). It is contemplated, however, that less accurate sample rate conversion systems may also be used with satisfactory results.

While the invention has been described in terms of a video resampling system, it is contemplated that it may be implemented in any resampling system in which some metric is available (e.g. the instantaneous interpolation phase) to indicate relative coincidence between respective samples of the input and output signals.

While the invention has been described in terms of an exemplary embodiment, it is contemplated that it may be practiced as outlined above within the spirit and scope of the appended claims.

The invention claimed is:

1. A phase locked output clock signal generation apparatus suitable for use in a video signal conversion system in which an input video signal, having an input sample rate which is determined by an input clock signal, is converted into an output video signal having an output sample rate, which is determined by said output clock signal, said apparatus comprising:
   means, coupled to receive the output signal for generating a phase reference signal having transitions which are desirably in a predetermined phase relationship with the input clock signal;
   phase comparison means, coupled to receive a signal representing instants at which predetermined samples of the input video signal occur and the phase reference signal component of the output video signal for generating a phase difference signal representing a difference in phase relative to a predetermined phase relationship between the respective input and output clock signals; and
   controlled oscillator means, responsive to the phase difference signal for generating said output clock signal in the predetermined phase relationship with the input clock signal.

2. Apparatus according to claim 1, wherein: said input video signal includes line synchronizing signal component; and the input clock signal is locked in phase to the line synchronizing signal component of the input signal.

3. Apparatus according to claim 2, wherein the signal representing instants at which predetermined samples of the input video signal occur is a transition of the input clock signal.

4. Apparatus according to claim 3, wherein the input video signal is defined by the CCIR 601 (625/25) standard and the output signal is defined by the PAL video standard.

5. A phase locked loop clock signal generation system comprising:
   a source of input video signal having a predetermined sample rate defined by an input clock signal and a horizontal line synchronizing signal component;
   signal conversion means, coupled to receive said input video signal and an output clock signal, for generating an output video signal having a horizontal line synchronizing signal component which has the same frequency as the horizontal line synchronizing signal component of the input video signal;
   phase comparison means, coupled to receive first and second signals representing the input clock signal and a signal representing the sampling phase of the output signal for generating an output signal representing a difference in sampling phase between said respective input and output signals;
   controlled oscillator means, responsive to the phase comparison means for generating said output clock signal which changes in frequency and phase to hold the output clock signal in a fixed phase relationship with the horizontal line synchronizing signal component of the input video signal.

6. A phase locked loop clock signal generation system according to claim 5, further including:
   synchronization signal detection means, coupled to receive said input video signal, for extracting the horizontal line synchronizing signal component therefrom and for providing a signal representing the horizontal line synchronizing signal component extracted from the input video signal, as said first signal to the phase comparison means; and
   synchronization signal means, coupled to receive said output video signal, for separating the horizontal line synchronizing signal component therefrom and for providing said horizontal line synchronizing signal component separated from said output video signal, as the second signal, to the phase comparison means.

7. A phase locked loop clock signal generation system according to claim 6, wherein:
   said controlled oscillator means includes a voltage controlled oscillator having a resonant crystal which is configured to limit said output clock signal to a predetermined band of frequencies.

8. Apparatus according to claim 7, wherein the first signal, representing the line synchronizing signal component of the input video signal is a predetermined sample of the input video signal.

9. A phase locked loop clock signal generation system according to claim 8, wherein said signal conversion means includes:
   memory means for holding samples representing a single pulse of a reference horizontal line synchronizing signal component;
   means for substituting said stored samples for samples representing the horizontal line synchronizing signal component of the input signal; and
   means for converting the input signal having the substituted horizontal line synchronizing signal component into said output video signal, wherein the horizontal line synchronizing signal component of the output video signal is converted with a temporal error of less than 1 nanosecond.

10. A phase locked loop clock signal generation system according to claim 9, wherein the input video signal conforms to the CCIR 601 (625/25) signal standard and the output video signal conforms to the PAL signal standard.

11. A clock signal generation system suitable for use with a video signal conversion system that converts input video signals having a predetermined line scanning frequency into output video signals having the same predetermined line scanning frequency, said clock signal generation system comprising:

controlled oscillator means, responsive to a control signal for generating said clock signal which may occupy a predetermined band of frequencies;

phase comparison means, coupled to receive the input video signal and the output video signal for generating the control signal for the controlled oscillator means, said control signal representing a difference in phase between the respective line scanning frequencies of the input and output video signals; and means for applying the clock signal to the video signal conversion system to minimize the difference in phase between the respective line scanning frequencies of the input and output video signals.

12. A clock signal generation system suitable for use with a resampling system that interpolates a sampled data output signal, which is synchronous with an output clock signal, from a sampled data input signal which is synchronous with an input clock signal, the clock signal generation system comprising:

controlled oscillator means, responsive to a control signal for generating the output clock signal;

resampling control means, coupled to the resampling system, for determining instants at which samples of the output signal are generated from the input signal at a predetermined interpolation phase, to produce a phase reference signal having transitions which correspond to the determined instants;

means, coupled to receive the sampled data output signal, for separating a synchronizing signal component therefrom and for providing said separated signal as an output synchronizing signal;

phase comparison means, coupled to receive the input clock signal and the output synchronizing signal, for generating a phase difference signal representing a difference in phase between respective transitions of the output synchronizing signal and the input clock signal;

means, coupled to the phase comparison means, and responsive to the phase difference signal for generating the control signal for the controlled oscillator means which operates to minimize the phase difference signal in magnitude; and means for applying the output clock signal to the resampling system to synchronize the interpolation of the output signal from the input signal.

13. A clock signal generation system according to claim 12, wherein the resampling system includes an interpolation filter, responsive to a plurality of sets of filter coefficients for implementing a respective plurality of interpolation phases, and wherein:

the resampling control means includes means, for specifying a sequence of the sets of interpolation filter coefficients to cause the interpolation filter to interpolate the sampled data output signal from the sampled data input signal according to a respective sequence of the interpolation phases; and the synchronizing signal has transitions which correspond to the specification of a predetermined one of the plurality of sets of filter coefficients by the resampling control means.

14. A clock signal generation system according to claim 13, wherein the predetermined set of filter coefficients corresponds to an interpolation phase in which the input sample is passed without modification as the output sample.

15. A clock signal generation system according to claim 14, wherein the resampling system converts an input CCIR 601 video signal to an output PAL video signal.

* * * * *

UNITED STATES PATENT AND TRADEMARK OFFICE
CERTIFICATE OF CORRECTION

PATENT NO. : 5,335,074
DATED : August 2, 1994
INVENTOR(S) : Stec

It is certified that error appears in the above-indentified patent and that said Letters Patent is hereby corrected as shown below:

On the title page item [75] should read :

Kevin J. Stec, Medford, N.J. and
Kenneth E. Vavreck, Maple Shade, N.J.

Signed and Sealed this

Eighth Day of November, 1994

Attest:

BRUCE LEHMAN

*Attesting Officer*        *Commissioner of Patents and Trademarks*